US008620896B2

(12) United States Patent
Soderstrom (10) Patent No.: US 8,620,896 B2
(45) Date of Patent: Dec. 31, 2013

(54) REVERSE MATCHING RELATIONSHIPS IN NETWORKS OF EXISTING IDENTIFIERS

(75) Inventor: Gustav Soderstrom, Bromma (SE)

(73) Assignee: Yahoo! Inc., Sunnyvale, CA (US)

( * ) Notice: Subject to any disclaimer, the term of this patent is extended or adjusted under 35 U.S.C. 154(b) by 448 days.

(21) Appl. No.: 11/951,887

(22) Filed: Dec. 6, 2007

(65) Prior Publication Data

US 2009/0150346 A1    Jun. 11, 2009

(51) Int. Cl.
*G06F 7/00* (2006.01)
*G06F 17/30* (2006.01)

(52) U.S. Cl.
USPC ............ 707/707; 707/758; 707/770; 707/785

(58) Field of Classification Search
USPC .................................................. 707/3, 707
See application file for complete search history.

(56) References Cited

U.S. PATENT DOCUMENTS

| 7,043,443 | B1 | 5/2006 | Firestone |
| 7,069,308 | B2 | 6/2006 | Abrams |
| 7,117,254 | B2 | 10/2006 | Lunt et al. |
| 7,188,153 | B2 | 3/2007 | Lunt et al. |
| 2002/0131397 | A1* | 9/2002 | Patel et al. ..................... 370/349 |
| 2003/0036914 | A1* | 2/2003 | Fitzpatrick et al. ............... 705/1 |
| 2004/0167813 | A1* | 8/2004 | Robertson et al. ................ 705/8 |
| 2005/0021750 | A1* | 1/2005 | Abrams ........................ 709/225 |
| 2005/0068947 | A1* | 3/2005 | Sanathana Murthy et al. ............................ 370/368 |
| 2005/0159970 | A1* | 7/2005 | Buyukkokten et al. ........... 705/1 |
| 2005/0171799 | A1 | 8/2005 | Hull et al. |
| 2005/0216300 | A1* | 9/2005 | Appelman et al. ................ 705/1 |
| 2005/0267766 | A1* | 12/2005 | Galbreath et al. ................ 705/1 |
| 2006/0004892 | A1* | 1/2006 | Lunt et al. ..................... 707/204 |
| 2006/0059164 | A1* | 3/2006 | Smola et al. .................... 707/10 |
| 2006/0064431 | A1* | 3/2006 | Kishore et al. ................ 707/102 |
| 2006/0089167 | A1* | 4/2006 | Idnani ........................... 455/518 |
| 2006/0106606 | A1* | 5/2006 | Labaton ....................... 704/250 |
| 2006/0130135 | A1* | 6/2006 | Krstulich et al. ............... 726/15 |

(Continued)

FOREIGN PATENT DOCUMENTS

| KR | 1020010036892 | 5/2001 |
| KR | 1020060006557 | 1/2006 |
| TW | I231907 B | 5/2005 |
| TW | I280492 B | 5/2007 |

OTHER PUBLICATIONS

International Search Report and Written Opinion for International Patent Application No. PCT/US2008/083936 mailed Apr. 28, 2009.

(Continued)

*Primary Examiner* — Binh V Ho
(74) *Attorney, Agent, or Firm* — James J. DeCarlo; Greenberg Traurig, LLP (57) ABSTRACT

A mobile device, system, and method are directed towards managing social networking information by employing a reverse matching search to identify those members of the social network that may have another person's identifier in their contact lists. The person may initially visit the social network site and provide an identifier either automatically or through a directed action by the person. A reverse search may be performed on members' contact lists to determine which contact lists include the identifier. If a match is found in a member's contact list, selected information about that member may be provided to the person. The reverse matching search may also be performed at various subsequent times to provide members information about new members to the social network.

20 Claims, 4 Drawing Sheets

(56) References Cited

U.S. PATENT DOCUMENTS

| | | | |
|---|---|---|---|
| 2006/0190536 A1* | 8/2006 | Strong et al. | 709/204 |
| 2006/0224675 A1* | 10/2006 | Fox et al. | 709/206 |
| 2006/0230061 A1* | 10/2006 | Sample et al. | 707/103 R |
| 2007/0005750 A1 | 1/2007 | Lunt et al. | |
| 2007/0011161 A1* | 1/2007 | Norton et al. | 707/6 |
| 2007/0073710 A1* | 3/2007 | Terrill et al. | 707/10 |
| 2007/0121602 A1* | 5/2007 | Sin et al. | 370/356 |
| 2007/0192299 A1* | 8/2007 | Zuckerberg et al. | 707/3 |
| 2007/0218900 A1* | 9/2007 | Abhyanker | 455/435.1 |
| 2007/0220611 A1* | 9/2007 | Socolow et al. | 726/26 |
| 2007/0255795 A1* | 11/2007 | Wang et al. | 709/207 |
| 2007/0282621 A1* | 12/2007 | Altman et al. | 705/1 |
| 2007/0282987 A1* | 12/2007 | Fischer et al. | 709/223 |
| 2008/0010598 A1* | 1/2008 | Smilowitz et al. | 715/745 |
| 2008/0028208 A1* | 1/2008 | Bolcer et al. | 713/156 |
| 2008/0059576 A1* | 3/2008 | Liu et al. | 709/204 |
| 2008/0250322 A1* | 10/2008 | Szeto et al. | 715/733 |
| 2008/0288277 A1* | 11/2008 | Fasciano | 705/1 |
| 2008/0294607 A1* | 11/2008 | Partovi et al. | 707/3 |
| 2009/0190738 A1* | 7/2009 | Guedalia et al. | 379/211.02 |
| 2011/0093498 A1* | 4/2011 | Lunt et al. | 707/769 |

OTHER PUBLICATIONS

International Preliminary Report on Patentability for International Patent Application No. PCT/US2008/083936 mailed Jun. 17, 2010.
Official Communication for Taiwanese Invention Patent Application No. 97145868 dated Oct. 26, 2012.

* cited by examiner

REVERSE MATCHING RELATIONSHIPS IN NETWORKS OF EXISTING IDENTIFIERS

TECHNICAL FIELD

The present invention relates generally to communications and, more particularly, but not exclusively to performing a reverse search to identify members of a social network that may have a person's identifier in their contact list.

BACKGROUND

Tremendous changes have been occurring in the Internet that influence our everyday lives. For example, online social network sites have become the new meeting grounds. They have been called the new power lunch tables and new golf courses for business life in the U.S.

Moreover, many people are using such online social network sites to reconnect themselves to their friends, their neighborhood, their community, and the world.

The development of such online social networking sites touch countless aspects of our everyday lives, providing instant access to people of similar mindsets, and enabling us to form partnerships with more people in more ways than ever before. However, because there are so many different sites, it is often difficult to decide with which social networking site to participate.

Sometimes, a deciding factor includes which of your known friends, co-workers, family, or the like, are already members of a particular social networking site. Determining whether these people are current members may be performed by providing the social networking site with a list of your friends, co-workers, family members, or the like, and requesting the site to let you know if they are currently a member. However, this is often a non-exhaustive search, especially, should you forget to provide a name, phone number, or similar identifier. Therefore, opportunities may be lost to the potential member, as well as to the social networking members, and even the owner of the site, when the potential member decides not to participate. Thus, there is a desire to provide improved information to a potential member of a social networking site that is useable to help in determining whether to become a member. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

As used herein, the terms "social network" and "social community" refer to a concept that an individual's personal network of friends, family colleagues, coworkers, and the subsequent connections within those networks. A social network, for example, can be utilized to find more relevant connections for a variety of activities, including, but not limited to dating, job networking, service referrals, content sharing, like-minded individuals, activity partners, or the like.

An online social network refers to a person's set of direct and/or indirect personal relationships, including real and virtual privileges and permissions that users may associate with these people. Direct personal relationships refers to relationships with people the user communicates with directly, including family members, friends, colleagues, coworkers, and other people with which the person has had some form of direct contact, such as contact in person, by telephone, by email, by instant message, by letter, or the like. These direct personal relationships are sometimes referred to as first-degree relationships. First-degree relationships can have varying degrees of closeness, trust, and other characteristics.

Indirect personal relationships refer to relationships through first-degree relationships to people with whom a person has not had some form of direct or limited direct contact, such as in being cc'd on an e-mail message, or the like. For example, a friend of a friend represents an indirect personal relationship. A more extended, indirect relationship might be a friend of a friend of a friend. These indirect relationships are sometimes characterized by a degree of separation between the people. For instance, a friend of a friend can be characterized as two degrees of separation or a second-degree relationship. Similarly, a friend of a friend of a friend can be characterized as three degrees of separation or a third-degree relationship, and so forth.

A social networking site then refers to a website, or other hosted network site, that is configured and arranged to provide services for social networking activities. Examples of such social networking sites include Yahoo! 360°®, Yahoo! Groups®, and Yahoo! Mash®, each of which are provided by Yahoo!, Inc., to name just a few.

As used herein, the term "contact list" refers to any source of information about a person's direct personal relationships. As such a contact list includes email address books, buddy lists, text messaging address lists, and the like. A contact list typically includes a name of a contact, and a phone number, or other unique identifier. A contact list may also an address, a tag indicating a relationship, or other selected information about the contact.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards managing social networking information by employing a reverse matching search, or simply, a reverse search, to identify those members of the social network that may have another person's identifier in their contact lists. Such information enables the person to know who within a social network knows them. The person may initially visit the social network site and provide an identifier. In one embodiment, the person may employ a client device that automatically and independent of a directed action by the person, provide an identifier, such as a phone number, or the like. In one embodiment, the identifier may be provided through a network carrier, a billing aggregator, or the like. In one embodiment, the identifier may be used to obtain additional information about the person, useable in performing the reverse search including, but not limited to a name, alias, or the like. In another embodiment, the person might provide an identifier, such as an email address. In one embodiment, the email address might be provided upon request. In another embodiment, a field within a display page might be configured for the person to provide the email address, or other identifier.

In any event, the identifier may then be used to perform a reverse search into members' contact lists to determine which contact lists include the identifier. If a match is found in a member's contact list, selected information about that member may be provided to the person. In one embodiment, a reverse search may also be performed even after the person becomes a member of the social network. In this manner, as new members join and make available their contact lists, other members may be notified of their participation.

As noted above, the person visiting the social networking site need not be a member to the site. Thus, by visiting the site, such as through a designated web page, landing page, or the like, the person may be provided with information about those people that know the person that are currently a member to the social networking site. Such information may be useable by the visitor in determining whether to join the social networking site. When the visitor selects to join, the visitor may be asked to make their contact list available for reverse searches to enable others to learn about their membership.

In one embodiment, the visitor might select not to join. However, access to selected content might still be made available to the visitor based, in part, on a match of their identifier within a member's contact list. For example, a member might enable visitors to the social networking site, even if they are not a member, to access selected content of theirs if the visitor's identifier is within the member's contact list. Thus, in one embodiment, a consumer of content at a social networking site might not have to be a member to the site. However, in another embodiment a producer of content might be a member to the social networking site.

Illustrative Operating Environment

Figure 1:
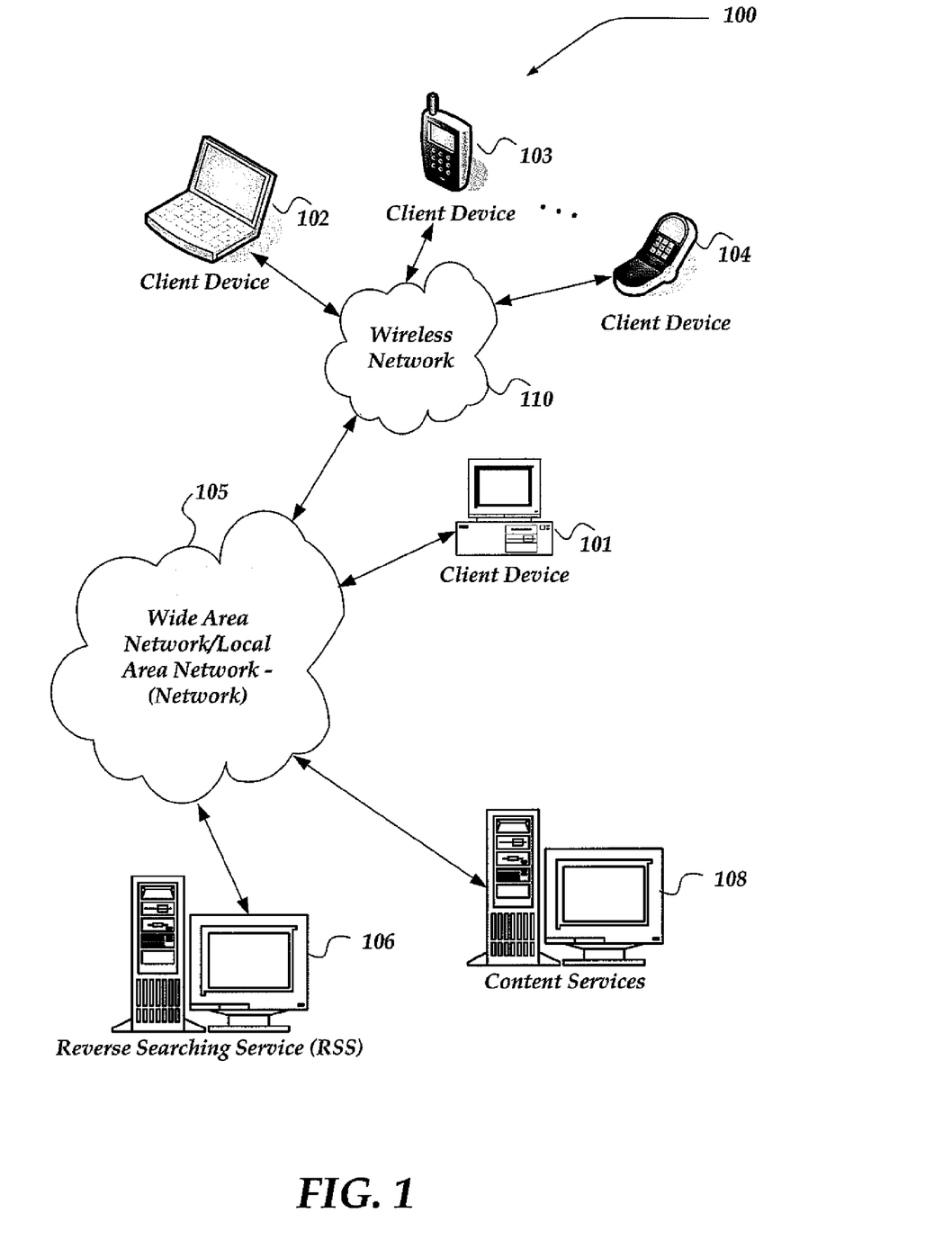
FIG. 1 is a system diagram of one embodiment of an environment in which the invention may be practiced.

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")–(network) 105, wireless network 110, client devices 101-106, Reverse Searching Service (RSS) 106, and content services 108.

Generally, client devices 102-104 may include virtually any mobile computing device capable of receiving and sending a message over a network, such as wireless network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. One embodiment of a mobile device usable as one of client devices 102-104 is described in more detail below in conjunction with FIG. 2.

Client device 101 may include virtually any computing device that typically connects using a wired communications medium such as personal computers, multiprocessor systems, microprocessor-based or programmable consumer electronics, network PCs, or the like. In one embodiment, one or more of client devices 101-104 may also be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client devices 101-104 also may include at least one other client application that is configured to receive content from another computing device. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MN, an electronic serial number (ESN), mobile device identifier, network address, or other identifier.

The identifier may be provided in a message, or the like, sent to another computing device. In another embodiment, the identifier may be provided to another computing device through various other mechanisms, including, but not limited to a network carrier's network device (not shown, but typically a component within wireless 110), a billing aggregator's network device, or the like.

Client devices 101-104 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, between another computing device. However, the present invention is not limited to these message protocols, and virtually any other message protocol may be employed.

Client devices 101-104 may further be configured to include a client application that enables the user to log into a user account that may be managed by another computing device, such as content services 108, RSS 106, or the like. Such user account, for example, may be configured to enable the user to receive emails, send/receive IM messages, SMS messages, access selected web pages, or participate in a social networking activity. However, managing of messages or otherwise participating in other social activities may also be performed without logging into the user account.

Thus, a user of client devices 101-104 may employ any of a variety of client applications to access content, read web pages, receive/send messages, or the like. In one embodiment, for example, the user may employ a browser or other client application to access a web page hosted by content services 108, RSS 106, or the like. In one embodiment, the web page might be a home page, or similar landing page associated with a social networking site. The user might be provided, independent of whether the user is a member to the social networking site, information about the members to the site that know the user. In another embodiment, independent of whether the user visiting the social networking site is a member of the site, the user might be able to access content associated with at least one member knowing the visiting user. Such information may then be useable, for example, to lower barriers to finding friends, family, or the like, that are members to the site. In one embodiment, the user might further be provided an opportunity to become a member to the social networking site. Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple RSS 106 and its components with other computing devices, including, content services 108, client device 101, and through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, or the like, in the signal. By way of example, communication media includes wired media such as twisted pair, coaxial cable, fiber optics, wave guides, and other wired media and wireless media such as acoustic, RF, infrared, and other wireless media.

Content services 108 includes virtually any network computing device that is configured to provide various resources, including content and/or social networking services over network 105. Content services 108 may also provide access to any of a variety of content, including, but not limited to messages, such as emails, SMS messages, IM messages, as well as content that may include audio files, video files, text files, streaming files, graphical files, or the like. Thus, virtually any content may be available through content services 108 for access by client devices 101-104. Content services 108 might also provide FTP services, APIs, web services, database services, or the like, to enable users to access content. However, content services 108 are not limited to these mechanisms, and/or content, and others are envisaged as well.

In one embodiment, content services 108 might be configured and arranged to provide a website for users to participate in a social networking activity. In one embodiment, participation might include becoming a member to the social networking activity. However, in another embodiment, participation might not require becoming a member.

In one embodiment, when a user visits a web page, such as a home page, or other designated landing page hosted by content services 108, the user might be presented with selected information about current members to the hosted social networking activity. Such information might include a name of the current member, a photograph, avatar, access to selected content, or the like. If the visitor is not a member of the social networking activity, content services 108 might provide the visitor with an opportunity to join. If the visitor is a member of the social networking activity, the information about the other members might include information about those members that joined the social networking activity within a defined time period. In this way, the visitor might be informed about those members that know the visitor and/or are new to the social networking activity.

Content services 108 may provide such information about the members to the visitor using a reverse searching application. The reverse searching application may, in one embodiment, be hosted on content services 108. In another embodiment, the reverse searching application might be made available through another computing device, such as RSS 106, or the like. In either instance, contact lists of members to the social networking activity may be made available to the reverse searching application.

Content services 108 may further obtain an identifier associated with the visitor from the visitor's client device, the visitor, or through another source, such as a network carrier's gateway or other computing device, or even from a billing aggregator. The identifier may then be provided to the reverse searching application for use in performing the reverse search.

Devices that may operate as content services 108 include, but are not limited to personal computers, desktop computers, multiprocessor systems, microprocessor-based or programmable consumer electronics, network PCs, servers, network appliances, and the like.

One embodiment of RSS 106 is described in more detail below in conjunction with FIG. 3. Briefly, however, RSS 106 may include any computing device capable of connecting to network 105 to enable a reverse searching of identifiers within a collection of contact lists. RSS 106 may therefore include a reverse searching application to perform the reverse search and provide results for use in, for example, a social networking activity. It should be noted, however, that such reverse searches are not limited to social networking activities, and may also be used for any of a variety of other applications, including, but not limited to reverse merchant searches, reverse directory searches, reverse entertainment searches, or the like.

RSS 106 may also be configured, in one embodiment, to host a social networking activity. Thus, in one embodiment, RSS 106 may operate substantially similar to content services 108. In any event, RSS 106 might receive an identifier for use in performing the reverse search. RSS 106 may further receive or be provided access to one or more data stores that include contact lists, or the like, in which the reverse search is to be performed. RSS 106 may then provide the results of the reverse search to content services 108, or other requesting social networking activity. In one embodiment, RSS 106 may employ a process such as described below in conjunction with FIG. 4 to perform at least some of its actions.

Devices that may operate as RSS 106 include personal computers, desktop computers, multiprocessor systems, microprocessor-based or programmable consumer electronics, network PCs, servers, or the like.

Illustrative Client Environment

Figure 2:
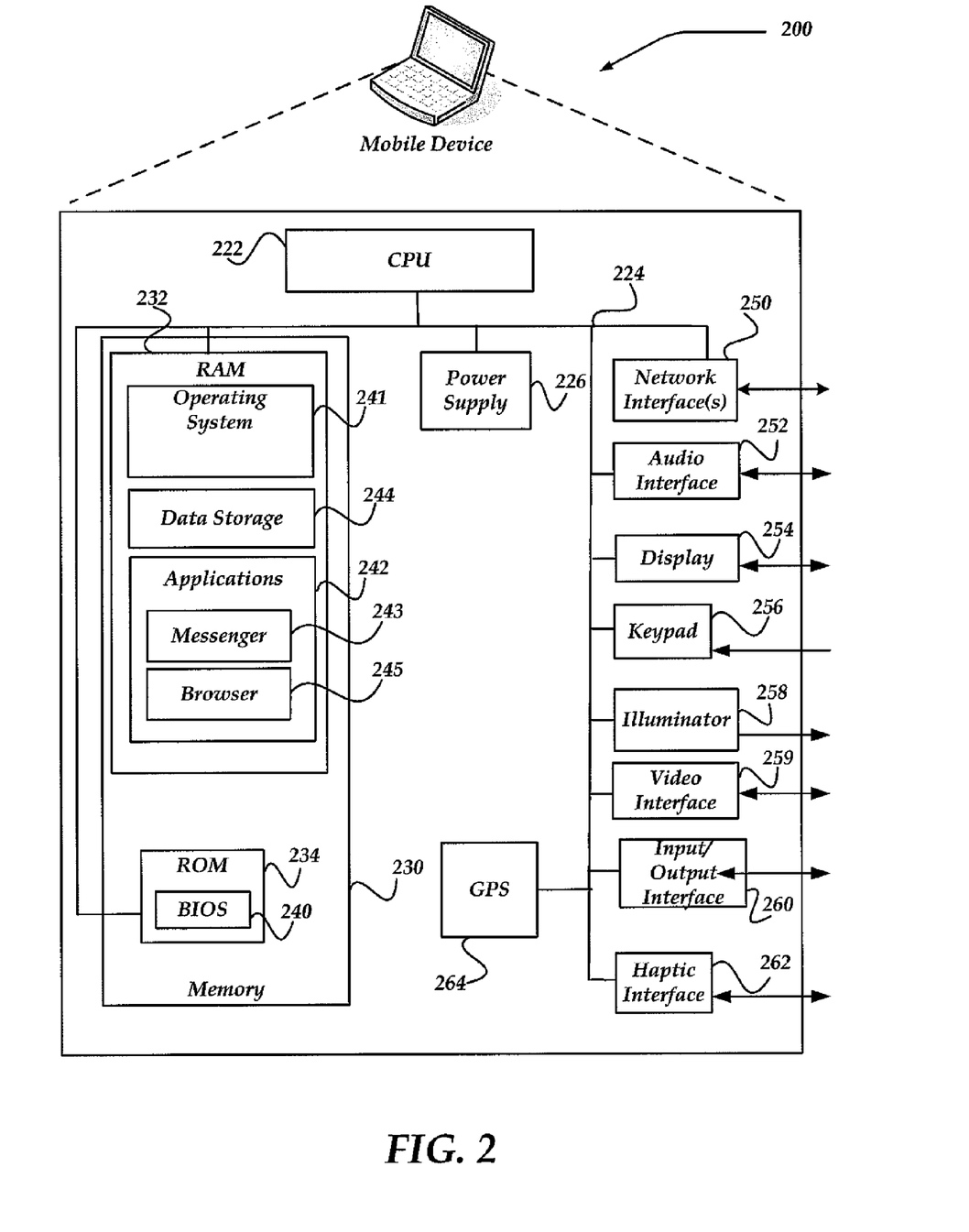
FIG. 2 shows one embodiment of a mobile device that may be included in a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, one of client devices 102-104 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, r any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, Wi-Fi, Zigbee, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, a client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by mobile device 200 to store, among other things, applications 242 and/or other data. For example, data storage 244 may also be employed to store information that describes various capabilities of mobile device 200, as well as store an identifier. The information, including the identifier, may then be provided to another device based on any of a variety of events, including being sent as part of a header during a communication, sent upon request, or the like. In one embodiment, the identifier and/or other information about mobile device 200 might be provided automatically to another networked device, independent of a directed action to do so by a user of mobile device 200. Thus, in one embodiment, the identifier might be provided over the network transparent to the user.

Moreover, data storage 244 may also be employed to store personal information including but not limited to contact lists, personal preferences, data files, graphs, videos, or the like. At least a portion of the information may also be stored on a disk drive or other storage medium (not shown) within mobile device 200.

Applications 242 may include computer executable instructions which, when executed by mobile device 200, transmit, receive, and/or otherwise process messages (e.g., SMS, MMS, IM, email, and/or other messages), multimedia information, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, and so forth. Applications 242 may include, for example, messenger 243 and browser 245.

Browser 245 may include virtually any client application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), extensible Markup Language (XML), and the like, to display and send a message. However, any of a variety of other web based languages may also be employed.

Messenger 243 may be configured as a client application that is configured to send, to receive, and/or to otherwise process messages using SMS, MMS, IM, email, VOIP, and/or any of a variety of other messaging communication protocols. Although a single messenger 243 is illustrated it should be clear that multiple applications may be employed. For example, one messenger 243 may be configured to manage SMS messages, where another application may manage IM messages, and yet another messaging client is configured to manage emails, or the like.

A user of mobile device 200 may employ browser 245 to search various content services, and/or other network sites for various social networking sites. In one embodiment, an identifier might automatically be sent over a network to a visited social networking site. As noted above, in one embodiment, the identifier might be a phone number associated with mobile device 200. However, the identifier is not limited to phone numbers, and may instead be an email address, unique user name, or other type of identifier, An application residing on the visited social networking site or accessible by the social networking site might automatically receive the identifier, and employ it to perform a reverse search in members' contact lists. The social networking site may then provide a list of matching members (those members having the identifier of mobile device 200 in their contact lists) to the user through a webpage displayed by browser 245. In another embodiment, however, the remote application might send a message to mobile device 200 using the identifier, where the message might include an invite to join the social networking site, a list of members that know the user based on the reverse search, and/or a variety of other information. In one embodiment, the message may be received through messenger 243.

In one embodiment, the user of mobile device 200 might be allowed access to selected content that a member of the social networking site has selected to share with others within their contact list. Thus, in one embodiment, once the user of mobile device 200 is identified (and possibly validated), and the user is identified within a member's contact list, then the user might automatically receive a display of at least one member's shared content. Such content may include any of a variety of data, including, but not limited to photographs, messages, videos, audios, texts, files, applications, scripts, graphics, or the like.

Illustrative Network Device Environment

Figure 3:
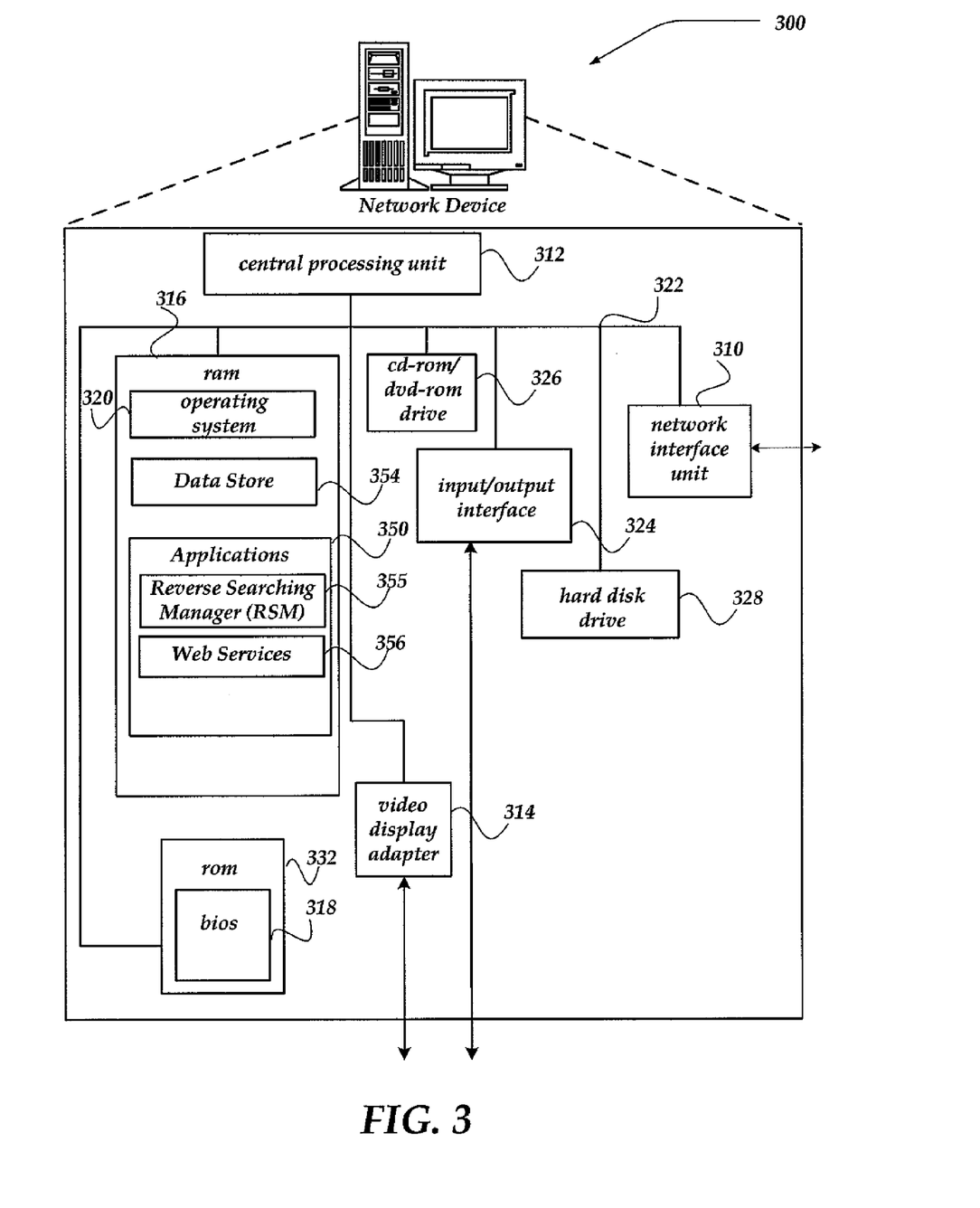
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, RSS 106 and/or content services 108 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. For example, mass memory might include data store 354. Data store 354 may be include virtually any mechanism usable for store and managing data, including but not limited to a file, a folder, a document, or an application, such as a database, spreadsheet, or the like. Data store 354 may manage information that might include, but is not limited to web pages, information about members to a social networking activity, contact lists, identifiers associated with a user, as well as scripts, applications, applets, and the like.

One or more applications 350 may be loaded into mass memory and run on operating system 320. Examples of application programs may include transcoders, schedulers, calendars, database programs, word processing programs, HTTP programs, customizable user interface programs, IPSec applications, encryption programs, security programs, VPN programs, web servers, account management, and so forth. Applications 350 may include Reverse Matching Manager (RMM) 355 and web services 356.

Web services 356 represent any of a variety of services that are configured to provide content over a network to another computing device. Thus, web services 356 include for example, a web server, messaging server, a File Transfer Protocol (FTP) server, a database server, a content server, or the like. Web services 3 56 may provide the content over the network using any of a variety of formats, including, but not limited to WAP, HDML, WML, SMGL, HTML, XML, cHTML, xHTML, or the like. In one embodiment, web services 356 may interact with RSM 355 when a client device requests content.

In one embodiment, web services 356 may be configured to provide social networking site content upon request from a client device. However, the information is not so limited and web services 356 may also be configured to provide a variety of other information, without departing from the scope of the invention.

RSM 355 is configured and arranged to perform a reverse search based on an identifier match with contact lists. In one embodiment, RSM 355 may receive from a client device an identifier automatically as part of a communication between the client device and network device 300. Thus, in one embodiment, the identifier might be provided transparently, independent of a separate directed action by a user of the client device to provide the identifier. In another embodiment, a request may be provided to the client device, wherein the identifier may be provided transparently to the user, or provided by the user. In another embodiment, the identifier might be obtained through a network carrier's network device, a billing aggregator's network device, or the like. In one embodiment, RSM 355 may attempt to confirm that the received identifier is valid. Validation of the identifier might be performed using any of a variety of mechanisms, including, for example, using the identifier to send a message and monitor for a response. Validation might further involve performing a search in another data store of identifiers to determine if the identifier is in the other data store. The other data store might be, for example, a billing aggregator's data store, a data store provided by an Internet Service Provider (ISP), a Wireless Service Provider, or the like.

In any event, RSM 355 may also access data store 354, or another data store located remote to network device 300 to obtain contact lists to be searched. RSM 355 may then use the validated identifier to search the contact lists for matches. If a match is found in a contact list, selected information about the member associated with that contact list may be determined. A list of selected information about members that have the identifier within their contact lists may then be obtained. This list may then be provided for display at a client device for use in enabling the user to decide, for example, whether to become a member, correspond with a member on the list, or the like. RSM 355 may employ a process such as described below in conjunction with FIG. 4 to perform at least some of its actions.

Generalized Operation

Figure 4:
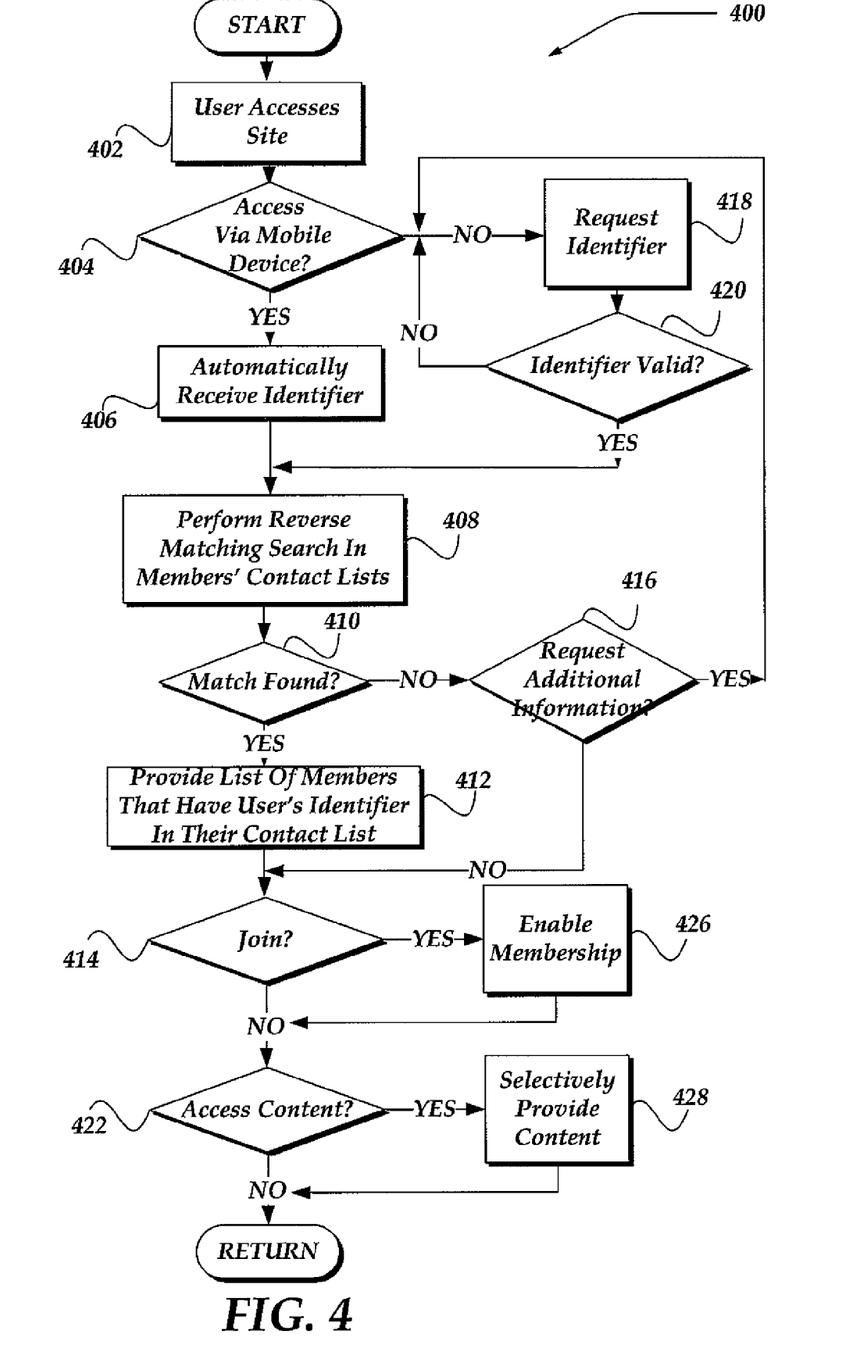
FIG. 4 illustrates a logical flow diagram generally showing one embodiment of a process for performing a reverse search to identify members of a social network that may have a person's contact in their contact list.

The operation of certain aspects of the invention will now be described with respect to FIG. 4. Process 400 of FIG. 4 may be implemented within a reverse search application that may execute within content services 108 and/or RSS 106 of FIG. 1.

Process 400 begins, after a start block, at block 402 where a user visits a social networking site configured to provide a results of a reverse search. The visitor may be a member of the social networking site, or a non-member. In one embodiment, the visitor might access a web page, such as a home page, or other landing page pre-configured to initiate a display of the results of the reverse search.

Processing flows to decision block 404 where a determination is made whether the visitor is accessing the site using a mobile device. In one embodiment, such determination is made, because many mobile devices are configured to automatically provide an identifier to the site. However, it should be clear that the decision might also be configured to determine whether the accessing device is configured to automatically provide an identifier, or whether an identifier may be obtained automatically for the accessing visitor. In any event if so, processing flows to block 406; otherwise, processing flows to block 418.

At block 406, the identifier for the visitor is automatically obtained independent of a directed action by the visitor. In one embodiment, the client device automatically provides the identifier. In another embodiment, a network carrier's network device might provide the identifier. In still another embodiment, the identifier may be provided through another network device, such as, for example, through a billing aggregator's network device, or the like. In any event, an identifier is automatically received. It should be clear that while an identifier may refer to a device identifier, the invention is not so limited. Thus, in another embodiment, the identifier might also be an email address for the visitor, a name of the visitor, or any of a variety of other unique information useable to perform a reverse search into contact lists. Processing then flows to block 408.

At block 418, a request might be displayed to the visitor for the visitor to submit an identifier. In one embodiment, the display might include some sort of message indicating that the visitor need not be a member, and that providing an email address, or other unique identifier, will enable the visitor to learn who is a member and might know the visitor. It should be clear that, although not illustrated, the visitor may select at any time to not submit an identifier, to move to another website, web page, or the like. However, if the visitor submits an identifier, processing flows to decision block 420, where the identifier is validated. Validation might include checking format of the identifier against standard formats, such as for phone numbers, email addresses, text messaging addresses, or the like. Validation may further include checking the identifier against know data stores to determine if the identifier is valid. Validation may even include using the identifier to send a message to the visitor, and if a defined response is received, then the identifier is considered to valid. Thus, if the identifier is determined to be valid, processing flows to block 408; otherwise, processing may loop back to block 418 to request the identifier to be re-submitted. It should be clear that while the process does not illustrate it, in one embodiment, the process might perform such loop backs a pre-defined number of times before exiting the process for invalid identifiers.

At block 408, the received identifier is used to perform a search within identified members' contact lists to determine if a match is found. Processing flows to decision block 410 where a determination is made whether at least one match is found. If a match is found, processing flows to block 412; otherwise, if not, then the process may move to decision block 416.

At decision block 416 a determination is made whether to request additional identifier information from the visitor. Such request might be performed if the visitor provided an IM address, or the like, and the available contact lists fail to include IM addresses, but include email addresses, phone numbers, or another form of identifier. The request may also be based on any of a variety other criteria. In any event, if additional identifier information is to be requested, processing may loop to block 418; otherwise, processing may flow to decision block 414.

At block 412, a list of selected information about the members for which a match was found is provided to visitor. In one embodiment, the selected information might include information approved by the member for public display, including, but not limited to a name, a photograph, an avatar, or the like. In one embodiment, the selected information might include an offer to enable the visitor to contact the member(s). For example, the visitor might be enabled to select a member within the list, and select and/or otherwise create a message to be sent to the selected member.

Moreover, if the visitor is already a member to the social networking site, in one embodiment, the list of selected information might be filtered to show member information for those members that have joined the site after a defined period of time. For example, in one embodiment, those members that know the visitor and have joined after the visitor joined might be selected for display. In another embodiment, those members that joined after the visitor's last reverse search might be selected for display.

In any event, processing continues to decision block 414, where a determination is made whether the visitor is a member to the social networking site. If not, processing flows to block 426; otherwise, processing flows to decision block 422. At block 426, the visitor might be provided with a display that enables the visitor to join and become a member to the social networking site. It is recognized that the visitor, while being provided the opportunity to join, need elects, registers the visitor as a member. Processing flows next to decision block 422.

At decision block 422, a determination is made whether at least one member of the social networking site has selected to enable the visitor to access at least some content at the site. For example, a member select to share content with others, independent of whether they are a member to the site, if the other is identified within the member's contact list. Thus, if the visitor is to be allowed access to selected content, processing flows to block 428; otherwise, processing returns to a calling process to perform other actions.

At block 428, selected content of one or more members, general content provided by an administrator, or the like, may be made available to the visitor independent of whether the visitor is a member. However, in another embodiment, other content might be made accessible based on whether the visitor is a member. Processing then returns to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A processor readable storage medium that includes data and instructions, wherein the execution of the instructions on a computing device enabling actions, comprising:
   receiving an identifier for a visitor of a social networking site;
   determining a plurality of contact lists for members of the social networking site;
   searching each of the contact lists in the plurality of contact lists to determine each contact list that includes a match to the visitor's identifier to enable the visitor to identify those members that know the visitor;
   determining selected information about each member associated with each contact list for which a match of the visitor's identifier is found;
   providing a display to the visitor of a list of the selected information for each member having a match in their contact lists to the visitor's identifier;
   if the visitor is not currently a member to the social networking site, the display enabling the visitor to become a member; and
if the visitor is currently a member, filtering the list of selected information such that the display comprises information indicating members that joined the social networking site at a defined time after the visitor joined.

2. The processor readable storage medium of claim 1, wherein receiving the identifier further comprises: automatically receiving the identifier transparent to the visitor over the network, wherein the identifier is associated with a mobile device identifier.

3. The processor readable storage medium of claim 1, wherein the identifier comprises at least one of a client device identifier, an email address, phone number, or a text messaging address.

4. The processor readable medium of claim 1, wherein the selected information comprises at least one of a name of a member, an alias of a member, a photograph of a member, or an avatar associated with a member.

5. The processor readable storage medium of claim 1, wherein receiving the identifier further comprises:
   requesting the identifier from the visitor;
   receiving the identifier provided by the visitor; and
   determining if the identifier is valid and associated with the visitor.

6. A method comprising:
   receiving an identifier associated with a visitor to a social networking site;
   determining a plurality of contact lists, each contact list in the plurality being associated with a member of the social networking site;
   searching each of the contact lists in the plurality of contact lists to determine each contact list that includes the visitor's identifier;
   determining each member associated with each contact list for which a match of the visitor's identifier is found to enable the visitor to know who within the social networking site knows the visitor;
   providing a display to the visitor comprising information about each member having a match in their contact lists to the visitor's identifier;
   if the visitor is not currently a member to the social networking site, the display enabling the visitor to become a member; and
if the visitor is currently a member, filtering the information about each member having a match in their contact list to obtain information indicating members that joined the social networking site at a defined time after the visitor joined and providing the obtained information to the visitor.

7. The method of claim 6, wherein receiving the identifier further comprises:
   receiving the identifier automatically and transparent to the visitor from at least one of a client device associated with the visitor, a network carrier's network device, or a billing entity's network device.

8. The method of claim 6, wherein receiving the identifier further comprises:
   requesting that the visitor provide the identifier; and
   determining if the received identifier is valid for the visitor.

9. The method of claim 6, further comprising:
   enabling the visitor to employ at least some of the displayed information to send a message to one of the members for which a match is found.

10. The method of claim 6, wherein the received identifier is at least one of a device identifier, a text message address, a user name, or an email address.

11. A network device comprising:
    a transceiver to send and receive data over a network; and
    a processor that is operative to perform actions, comprising:
      receiving an identifier for a visitor of a social networking site;
      receiving information from a plurality of contact lists, each contact list in the plurality being associated with a different member of the social networking site;
      searching each of the contact lists in the plurality of contact lists to determine each contact list that includes a match to the visitor's identifier to enable the visitor to know who within the social networking site knows the visitor;
      providing to the visitor a list of members having a match in their respective contact lists;
      if the visitor is not currently a member to the social networking site, providing a display enabling the visitor to become a member; and
    if the visitor is currently a member, filtering the list of members to obtain information indicating members in the list of members that joined the social networking site at a defined time after the visitor joined and providing the obtained information to the visitor.

12. The network device of claim 11, wherein the processor is operative to perform actions, further comprising:
    for at least one member in the list of members having a match, enabling a display of selected content of the at least one member, independent of whether the visitor is a member of the social networking site.

13. The network device of claim 11, wherein providing the list further comprises providing at least one of a name of each member, an alias for each member, a photograph of each member, or an avatar for each member having a match.

14. The network device of claim 11, wherein receiving the identifier further comprises receiving the identifier automatically from a mobile device associated with the visitor.

15. The network device of claim 11, wherein providing the list further comprises, if the visitor is not a member of the social networking site, providing an offer to the visitor to become a member.

16. A mobile device comprising:
    a memory arranged to store data and instructions;
    an input interface for receiving requests and sending responses; and
    a processor arranged to enable actions embodied by at least a portion of the stored instructions, the actions comprising:
      accessing the social networking site over the network;

automatically providing to the site an identifier associated with a user of the mobile device;

receiving a display from the social networking site, wherein the display includes a list of members to the social networking site that has in their respective contact lists the provided identifier associated with the user, wherein the list of members is determined based on a reverse search of each member's contact lists for a match to the user's identifier to enable the user to know who within the social networking site knows the visitor;

receiving an offer to join the social networking site, if the user of the mobile device is determined to not be a current member to the site; and if the visitor is currently a member, the received display comprises information indicating members from the list that joined the social networking site at a defined time after the visitor joined.

17. The mobile device of claim 16, wherein automatically providing the identifier further comprises providing a device identifier transparent to the user by at least one of the mobile device, a network carrier's network device associated with the mobile device, or providing the identifier through a billing entity's network device.

18. The mobile device of claim 16, wherein the processor is arranged to enable actions further comprising:

independent of whether the user of the mobile device is a member of the social networking site, receiving a display of content, the content being provided by at least one member within the list of members having a match to the identifier within their contact list.

19. The mobile device of claim 16, wherein the list of members further comprises a list of at least one of a member's phone number, email address, name, photograph, or avatar.

20. The mobile device of claim 16, wherein the list of members further comprises a list of members that have joined the site after the user, if the user is a member of the social networking site.

* * * * *